F. ROSTAS 3,545,867
METHOD OF AND APPARATUS FOR MEASURING THE DENSITY OF A PLASMA
OR TRANSPARENT SEMICONDUCTOR
Filed July 3, 1968

INVENTOR
FRANCOIS ROSTAS

United States Patent Office 3,545,867
Patented Dec. 8, 1970

3,545,867
METHOD OF AND APPARATUS FOR MEASURING THE DENSITY OF A PLASMA OR TRANSPARENT SEMICONDUCTOR
François Rostas, Chatenay-Malabry, France, assignor to Compagnie Generale d'Electricite, Paris, France, a French corporation
Filed July 3, 1968, Ser. No. 742,307
Claims priority, application France, July 4, 1967, 112,932
Int. Cl. G02f *1/22;* G01n *21/22*
U.S. Cl. 356—114         4 Claims

ABSTRACT OF THE DISCLOSURE

Apparatus and method for measuring the magnetic rotational dispersion of a transparent body and in particular for measuring the electron density of a plasma or a transparent semiconductor comprising measuring the optical beat frequency obtained from the output of a laser in the cavity of which is placed a plasma or said body and means for creating an axial magnetic field.

BACKGROUND OF THE INVENTION

Field of the invention

The present invention relates to a method of and an apparatus for measuring the electron density of a plasma utilizing the rotational dispersion of the electrons.

Description of the prior art

Optical interferometry is of great interest in the physics of plasmas, because the very high frequency of the optical waves enables them to pass through all the gas plasmas at present employed. On the other hand, the sensitivity of the measurement is low, precisely because of the great difference which generally exists between the plasma frequency and the frequency of the optical wave. In practice, the refractivity of the electrons is often of the same order of magnitude as that of the ionized gas, whereby the measurements are appreciably complicated.

One of the first methods proposed for applying the properties of lasers to the analysis of plasmas was the measurement of the rotation of the plane of polarization of the light produced by the electrons in the presence of a magnetic field. For example, when the plasma is in a magnetic field of 50,000 gauss, for a density of $10^{15}$ cm.$^{-3}$, the plane of polarization of light having a wavelength of 1 micron rotates through an arc of 5 minutes.

Other methods have been employed to improve the sensitivity of laser interferometers. One such method involves measuring, not the difference of travel introduced by the plasma, but the modification of the frequency of the laser which results from the introduction of the plasma into the laser cavity. This method is sensitive enough to give a shift of 150 m./s. per fringe for a cavity of 1 meter.

This shift is measured by causing the beams issuing from two lasers to beat, one of these beams being from a frequency-stabilized laser and the other beam originating from a laser having the plasma in its cavity. However, the same beam can be used by bisecting it, one section passing through the plasma and the other serving solely as a reference.

These methods are very interesting, but their sensitivity is limited by parasitic effects.

SUMMARY OF THE INVENTION

The present invention has for its object to provide an apparatus which possesses the advantages of the known apparatus, but which eliminates some of the disadvantages thereof.

The present invention concerns an apparatus for measuring the rotary polarization power of a transparent body. The invention uses an optical cavity having therein a gas laser tube with outlet windows substantially perpendicular to the path of the light beams and the said transparent body. The apparatus also includes means for creating a rotational dispersion of the polarization of the light beams by application of an axial magnetic field in the said body, and means for detecting the optical beat frequency of the radiation emerging from the said optical cavity.

The present invention also concerns a method of measuring the electron density of a plasma in which the optical beat frequency of a laser beam is measured, the beam being obtained by introducing into the cavity of the laser the plasma to which an axial magnetic field is applied.

The present invention has many advantages, including very high sensitivity of measurement, elimination of the parasitic effects due to vibration of the mirrors resulting from the fact that the two beams are constantly coincident, complete insensitivity to variations in the density of the neutral gases of the plasma, complete insensitivity to accidental variations of the index of the media traversed (ambient atmosphere, windows) in the optical cavity, and simplicity of the measurement and of the construction of the apparatus.

BRIEF DESCRIPTION OF THE DRAWING

Further features and advantages of the present invention will become apparent from the following description with reference to the accompanying drawings, in which.

DESCRIPTION OF THE PREFERRED EMBODIMENTS

Figure 1:
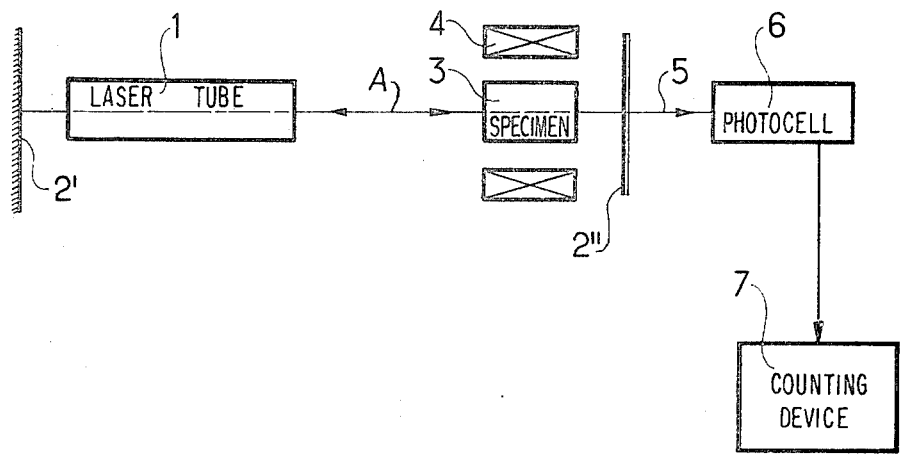
FIGS. 1 and 2 show diagrams illustrating the principle of two practical embodiments of the present invention.

FIG. 1 illustrates the apparatus according to the invention, which comprises an optical cavity containing a laser device, such as a laser tube 1, for example a helium-neon tube, which gives a light of a wavelength of 3.39μ terminated by two plane foils having parallel faces perpendicular or approximately perpendicular to the axis A of the tube, so as not to cause a preferred direction for the plane of polarization of the emitted light.

Situated within the optical cavity, which is bounded by two mirrors 2' and 2", is a cell 3 containing the specimen of plasma to be tested. This cell is disposed at the center of a coil 4 which generates longitudinal magnetic fields of variable values. The longitudinal axis of the cavity coincide with axis A.

A photosensitive element 6, such as a photomagnetoelectric (PME) cell, or an indium antimonide photodiode, receives the light beam 5 emerging parallel to axis A from the optical cavity, and the output signal of this photosensitive element is recorded by a counting device 7 such as, for example, a frequency meter.

In accordance with the present invention, the method of analyzing the electronic density of a plasma consists essentially in introducing the plasma into the cell 3 and causing the laser 1 to emit, without the latter having a preferred direction for the plane of polarization of the light, whereby the use of windows having Brewster incidence is precluded.

It is known that the refractive index of electrons under these conditions differs with a wave circularly polarized clockwise and with a wave polarized counterclockwise.

The result of this is that one of the modes of the cavity undergoes a frequency variation by a quantity Δf, since the optical length of the cavity is not the same for the two directions of polarization. Consequently, the light emerging from an optical cavity of the type described consists of two neighboring frequencies. The electrical signal supplied by the photosensitive element contains an alternating component whose frequency is equal to the frequency difference $\Delta f$. For a given magnetic field, this frequency is proportional to the electron density of the plasma.

The lower limit of the beat frequencies which can be measured is determined by the synchronization of the two modes which occur when the frequencies of the modes are too close together (effect known as "locking frequency"). Since the lower frequency limit caused by these effects is of the order of several tens of cycles per second, depending upon the lasers, it may therefore be desirable, for the sensitivity of the measurement, to introduce a constant frequency difference in the absence of plasma. The frequency differences due to the plasma to be tested are thereafter measured around this fixed frequency.

Figure 2:
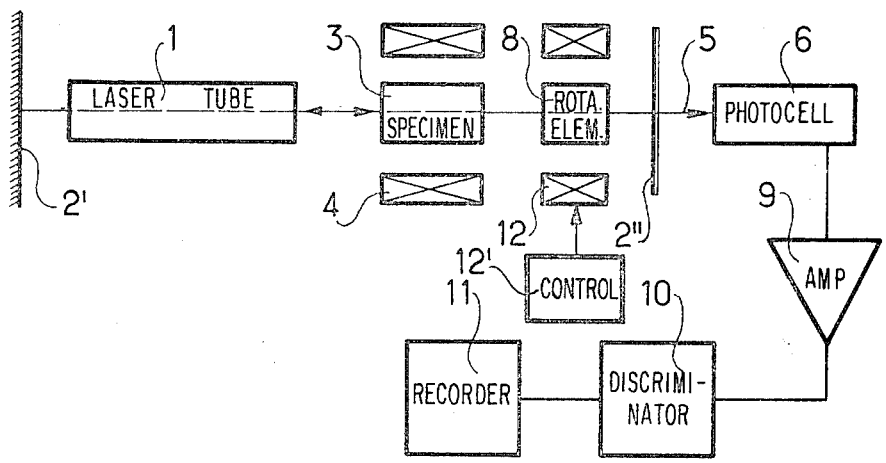

Such a method may be employed for an apparatus as diagrammatically illustrated in FIG. 2. The apparatus comprises a cell 3, similar to that of FIG. 1, and an element 8 having a rotational dispersion ability under the action of a magnetic field supplied, for example, by the coil shown at 12. The apparatus also comprises a control means 12' with which it is possible to vary the value of the intensity of the magnetic field and its direction.

The element 8 may conveniently consist of a semiconductor, such as germanium, silicon, gallium phosphide or gallium arsenide. The element 8 introduces a constant frequency difference for a given magnetic field. The fixed beat frequency thus obtained may be adjusted with the aid of the control device 12', with which it is possible to compensate partially or totally the frequency difference produced by the plasma, for example in the case of dense plasmas subjected to high magnetic fields which would otherwise give excessively large frequency differences.

By way of example, there is illustrated in FIG. 2 an information analyzing network for analyzing the information received by the photosensitive element upon detection and measurement of relatively rapid variations of the electron density in a plasma. The fixed frequency difference introduced by the cell 8 may be sufficiently great (for example 10 mc./s.) to allow following rapid frequency variations detected by the detector 6 about this mean value.

The information-analyzing network consists of a amplifier 9 connected to a discriminator 10 which transforms the frequency modulation into an amplitude modulation proportional to the electron density of the plasma.

The amplitude-modulated signal is collected at a device 11 which may be, for example, a recorder.

Gas plasmas are not the only ones which are envisaged by the present invention, and it is obvious that the method applicable to the measurement of low electron densities in semiconductors transparent to infrared rays.

It is to be noted that a number of other laser radiations are applicable, it merely being necessary for this purpose that the gain should be sufficient.

Generally speaking, the described apparatus makes it possible to measure very low magnetic rotatory powers, and it may therefore be applied to nondestructive testing of specimens of various materials.

While the invention has been particularly shown and described with reference to preferred embodiments thereof, it will be understood by those skilled in the art that the foregoing and other changes in form and details may be made therein without departing from the spirit and scope of the invention.

What is claimed is:
1. An apparatus for measuring the electron density of a plasma comprising:
   (a) a single optical cavity having a longitudinal axis,
   (b) a lasing device in said cavity for generating a nonpolarized laser beam parallel to said axis in said single cavity,
   (c) a plasma located in said single cavity in the path of said beam,
   (d) means for applying an axial magnetic field to said plasma to cause rotational dispersion of the polarization of said beam as it passes through said plasma in said single cavity, and
   (e) means for detecting the optical beat frequency of a laser beam emerging from said single optical cavity, said beat frequency being a measure of the electron density of said plasma.
2. An apparatus as defined in claim 1 further comprising in said optical cavity a transparent element causing a known rotational dispersion of the polarization of said beam in said cavity.
3. An apparatus as defined in claim 2 further comprising means for applying a magnetic field to said element to adjust said known rotational dispersion.
4. A method of measuring the electron density of a plasma comprising:
   (a) placing said plasma in an optical laser cavity having a longitudinal axis,
   (b) generating in said cavity a nonpolarized laser beam passing through said plasma,
   (c) applying an axial magnetic field to said plasma to cause rotational dispersion of the beam passing through said plasma in said cavity, and
   (d) measuring the optical beat frequency of the laser beam emanating from said cavity, said beat frequency being proportional to the electron density of said plasma.

References Cited

UNITED STATES PATENTS 3,277,392   10/1966   Nicolai _____ 331—94.5
3,354,404   11/1967   Boyle et al. _____ 331—94.5

OTHER REFERENCES

Malamud, H.: "Measurement of Low Electron Density in Plasmas Using Laser Interferometry," Review of Sci. Instr., vol. 36, 1965, pp. 507–08.

Rostas: Le Journal de Physique, vol. 27, 1966, pp. 367–376.

RONALD L. WIBERT, Primary Examiner

J. ROTHENBERG, Assistent Examiner

U.S. Cl. X.R.

73—30; 250—225; 331—94.5; 350—151; 356—201